(12) United States Patent
Manuli

(10) Patent No.: US 6,460,897 B1
(45) Date of Patent: Oct. 8, 2002

(54) CONNECTOR FOR FLEXIBLE PIPES HAVING AT LEAST ONE RESILIENT SEALING RING

(75) Inventor: Dardanio Manuli, Milan (IT)

(73) Assignee: Manuli Auto Italia S.p.A., Bologno (IT)

( * ) Notice: Subject to any disclaimer, the term of this patent is extended or adjusted under 35 U.S.C. 154(b) by 0 days.

(21) Appl. No.: 09/930,282

(22) Filed: Aug. 16, 2001

Related U.S. Application Data

(63) Continuation of application No. 08/750,225, filed on Nov. 22, 1996, now abandoned.

(30) Foreign Application Priority Data

May 27, 1994 (IT) .......................................... BO940102 U
May 23, 1995 (WO) ................................ PCT/EP95/01947

(51) Int. Cl.$^7$ ............................... F16L 9/14; F16L 33/20
(52) U.S. Cl. ...................................... 285/256; 285/259
(58) Field of Search .............................. 285/256, 259, 285/242, 328

(56) References Cited

U.S. PATENT DOCUMENTS

| | | | |
|---|---|---|---|
| 2,453,997 A | | 11/1948 | MacWilliam |
| 4,522,435 A | | 6/1985 | Miller et al. |
| 4,666,190 A | | 5/1987 | Yamabe et al. |
| 4,906,030 A | * | 3/1990 | Yokomatsu et al. ........ 285/256 |
| 5,044,671 A | | 9/1991 | Chisnell |
| 5,082,315 A | | 1/1992 | Sauer |
| 5,096,231 A | | 3/1992 | Chisnell |
| 5,332,269 A | | 7/1994 | Homm |
| 5,378,023 A | * | 1/1995 | Olbrich ........................ 385/256 |
| 5,961,157 A | | 10/1999 | Baron et al. |
| 6,010,162 A | | 1/2000 | Grau et al. |
| 6,095,571 A | * | 8/2000 | MacDuff et al. ............. 285/256 |
| 6,099,045 A | * | 8/2000 | Pirona ........................ 285/256 |

FOREIGN PATENT DOCUMENTS

| | | | | |
|---|---|---|---|---|
| AU | 142779 | * | 4/1949 | ................ 285/256 |
| DE | 2430665 | * | 1/1976 | ................ 285/256 |
| DE | 3243365 | * | 5/1984 | ................ 285/256 |
| DE | 4231623 | * | 3/1994 | ................ 285/256 |
| FR | 2675880 | * | 10/1992 | ................ 285/256 |
| GB | 2177769 | * | 1/1987 | ................ 285/256 |
| IT | 637731 | | 4/1962 | |
| JP | 163592 | | 6/1990 | |
| JP | 402256992 | | 10/1990 | |
| JP | 40-4088286 | | 3/1992 | |

* cited by examiner

*Primary Examiner*—Eric K. Nicholson
(74) *Attorney, Agent, or Firm*—Arent Fox Kintner Plotkin & Kahn, PLLC

(57) ABSTRACT

A connector (10) for flexible pipes, particularly for use in cooling or air-conditioning systems for motor vehicles, comprises a hollow main body including a coupling element (13) for a flexible pipe, the coupling element having at least one gripping tooth (16a, 16b) for cooperating with clamping means (6) to grip a flexible pipe (14) when the connector is in the condition of use. The connector comprises at least one sealing ring (17) having a substantially cylindrical inside wall (18) and a shaped, preferably arcuate, outside wall (19). The sealing ring (17) exhibits resilient behaviour in a radial direction and is compressed radially, when the connector (10) is in the condition of use, by the flexible pipe (14) which is fitted and clamped on the coupling element (13) by the clamping means (6).

8 Claims, 1 Drawing Sheet

CONNECTOR FOR FLEXIBLE PIPES HAVING AT LEAST ONE RESILIENT SEALING RING

This application is a continuation of Ser. No. 08/750,225 filed Nov. 22,1996 now abandoned.

BACKGROUND OF THE INVENTION

1. Field of the Invention

The present invention relates to a connector for flexible pipes, particularly for use in cooling or air-conditioning systems for motor vehicles, of the type comprising a hollow main body including a coupling element for a flexible pipe, the coupling element having at least one gripping tooth for cooperating with clamping means to grip the flexible pipe when the connector is in the condition of use.

2. Description of the Related Art

An example of a connector of the known type indicated above is illustrated and generally indicated 1 in the appended FIG. 1. This connector has a tubular coupling element 2 on which two ramp-like, annular teeth 3 and two pairs of sealing collars 4 are formed integrally. In use, the end of a flexible pipe 5 is fitted and clamped on the coupling element 2 by the plastic deformation of a collar 6 which, in the example of FIG. 1, is constituted by a pair of bands 7 connected in a tandem configuration by a transverse plate 8.

A disadvantage of known connectors is that the characteristics of the seal between the pipe and the coupling element for preventing the escape or leakage of the operating fluid are not entirely satisfactory when the fluid has small molecular dimensions.

This problem is accentuated by the fact that, in order to reduce the permeability of the pipes to fluids of this type, flexible pipes having an internal sheathing of polyamide material, particularly nylon, are often used.

As is known, polyamide materials generally have poor flexibility characteristics and hence a poor ability to adapt to the gripping teeth of the coupling elements of the connectors, particularly to ramp-like annular teeth, with the risk of imperfect adhesion between the inside wall of the pipe and the coupling element, although only in a localized region.

Another disadvantage of known connectors connected to flexible pipes having an internal polyamide sheathing is caused by the difference between the coefficient of thermal expansion of the sheathing and that of the metal of which the connector, including any sealing collars, is made. This difference between the coefficients of thermal expansion means that the coupling element of the connector tends to contract radially to a greater extent or more rapidly than the flexible pipe as a result of abrupt reductions in the running temperature, with the consequent danger of the fluid leaking.

SUMMARY OF THE INVENTION

The object of the present invention is to overcome the aforesaid problems by means of a connector of the type indicated in the introduction to the present description, characterized in that it comprises at least one sealing ring having a substantially cylindrical inside wall and a shaped outside wall, the sealing ring exhibiting resilient behaviour in a radial direction and being compressible radially, when the connector is in the condition of use, by the flexible pipe which is fitted and clamped on the coupling element by the clamping means.

An advantage of the connector according to the present invention is that its fluidtightness is ensured even in the presence of any geometrical defects or surface faults either of the coupling element or of the passage inside the flexible pipe, reducing production costs by virtue of the lower incidence of rejects. In fact, by virtue of the sealing ring, the fluidtightness of the connector is not affected by lack of adhesion of the flexible pipe to the coupling element in a localized region thereof.

Another advantage of the connector according to the present invention results from the fact that, even in difficult conditions of use, it is not necessary to increase the force with which the flexible pipe is clamped onto the connector to ensure a satisfactory seal and the risk of undesired deformation or breakage of the coupling element or of the internal polyamide sheathing, when it is present, is thus reduced.

If the connector according to the present invention is used with a flexible pipe having an internal polyamide sheathing, another advantage is achieved; in this case, the friction between the sealing ring and the polyamide sheathing, which is undoubtedly greater than the friction which normally arises between the sheathing and the metal of known connectors, effectively stops any relative rotation between the connector and the pipe when clamping has been effected. The risk of fluid leaking or escaping is thus undoubtedly reduced.

According to another characteristic of the present invention, the sealing ring is housed with a resilient forced fit in an annular recess in the coupling element.

An advantage resulting from this characteristic is that the fitting of the sealing ring on the coupling element is quick and easy to do and can easily be automated. Moreover, the longitudinal position of the sealing ring on the coupling element is defined at the design stage so as to optimize the sealing characteristics of a certain model of connector according to the type of clamping means used for the flexible pipe.

According to a further characteristic of the connector according to the present invention, the outside wall of the sealing ring is substantially arcuate in shape.

Two advantages result from this further characteristic; on the one hand, it prevents the sealing ring from being displaced or rolled up when the flexible pipe is fitted on the coupling element since the convex shape of its outside wall favours the sliding of the flexible pipe thereon, as long as it is not clamped; on the other hand, the compression force exerted on the sealing ring radially by the flexible pipe clamped onto the coupling element is preferably discharged uniformly onto the sides of the sealing ring, bringing about, amongst other things, a more progressive resilient action and a greater useful travel.

BRIEF DESCRIPTION OF THE DRAWINGS

Further characteristics and advantages of the present invention will become clear from the detailed description which follows, with reference to the appended drawings, given by way of non-limiting example, in which.

DETAILED DESCRIPTION OF PREFERRED EMBODIMENT

Figure 1:
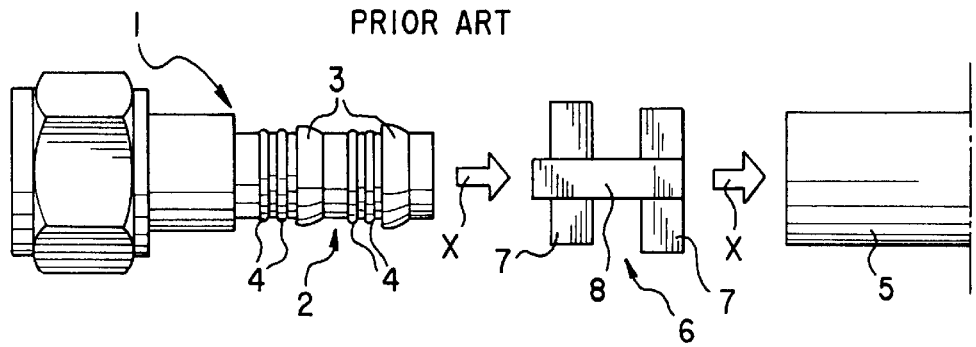
FIG. 1 is an exploded side view of a connector, a clamping collar and a flexible pipe of the prior art which have already been discussed briefly in the introduction to the present description.

With reference now to the drawings, FIG. 1 shows a known connector, the characteristics of which have already been described above in the introduction to the present description. In this drawing, the direction in which the components (the connector, the clamping collar and the flexible pipe) are assembled when the connector is in use is shown by the arrows X.

Figure 2:
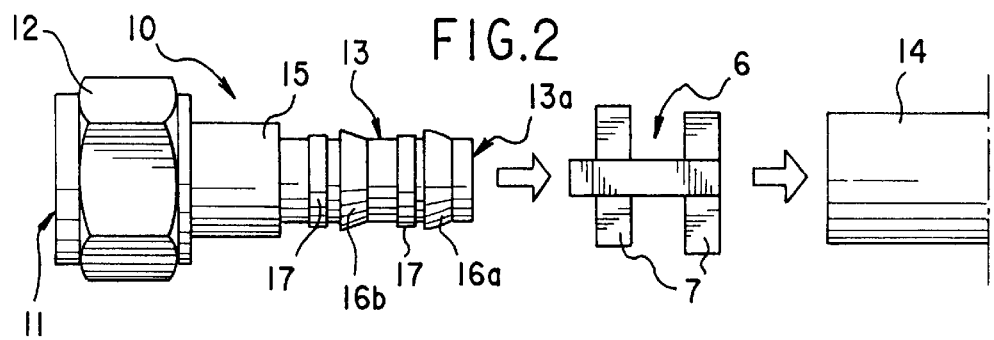
FIG. 2 is a side view similar to FIG. 1 of a connector according to the present invention.

FIG. 2 shows a connector according to the present invention, comprising an elongate, hollow body, generally indicated 10, having an internally threaded opening at its end which is on the left in the drawing. A nut 12 is formed integrally on the connector 10 to enable the opening 11 to be screwed onto a corresponding rigid threaded member of the system in which the connector is used. At the opposite end to the opening 11, the connector 10 has a tubular coupling element 13 for the fitting of a flexible pip An intermediate tubular portion 15 having an outside diameter larger than the outside diameter of the coupling element 13 is preferably interposed between the coupling element 13 and the nut 12. Two annular ramp-like teeth 16a, 16b are spaced apart on the outside wall of the coupling element 13, one tooth (16a) being disposed near the end 13a of the coupling element 13 and the other tooth (16b) in a position intermediate the first tooth 16a and the intermediate tubular portion 15. The teeth 16a, 16b cooperate with a clamping element of known type such as, for example, the collar 6 which has bands 7 in tandem, so as to prevent the flexible pipe 14 from coming off the connector 10 when, with the connector in the assembled condition, the bands 7 are tightened onto the flexible pipe 5 by plastic deformation so as to deform or squash it locally in regions corresponding to the teeth 16a, 16b.

Two resilient sealing rings 17 are fitted on the coupling element 13, near respective teeth 16a, 16b, on the opposite sides to the end 13a of the coupling element 13 and in substantially predetermined axial positions. Naturally, since the configuration of FIG. 2 is given by way of example, an alternative solution for the connector according to the present invention may be limited simply to the formation of a single tooth and to the provision of a single corresponding sealing ring 17.

Figure 3:
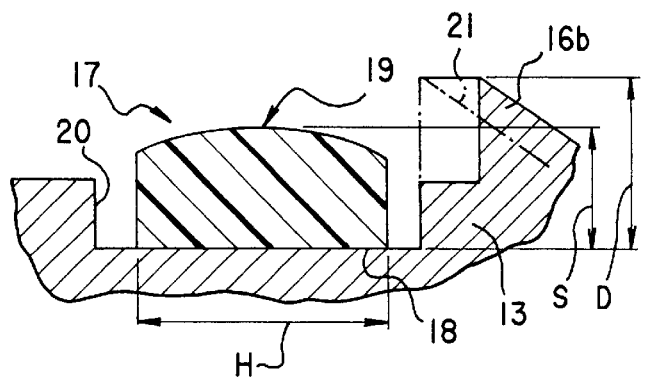
FIG. 3 is an enlarged, partial longitudinal section of a detail of the connector of FIG. 1 or of the variant thereof of FIG. 4, showing the sealing ring.

As shown in detail in FIG. 3, each sealing ring 17 is constituted by a ring of resilient material, preferably rubber, having a substantially cylindrical inside wall 18 and an outside wall 19 with a shaped cross-section. In particular, in the embodiment shown in the drawing, the outside wall 19 is curved like a barrel so as to have a symmetrical arcuate profile in cross-section. The profile of the outside wall 19 is not limited to an arcuate shape and may be configured with a profiled shape which, in any case, is selected on the basis of the conditions of use of the connector and of the characteristics of the associated flexibe pipe. More specifically, the outside wall 19 may effectively be shaped with a recessed arcuate sloping, or arrow-head profile or may have more or less accentuated corrugations.

The inside diameter of the sealing ring 17 is smaller than the diameter of the base of an annular recess 20 in the coupling element 13 so that the sealing ring 17 can be fitted in the annular recess 20 with a certain degree of radial forcing owing to the resilience of the sealing ring. The annular recess 20 is wider than the sealing ring 17, for reasons which will become clearer from the following.

In a preferred embodiment, the width H of the cross-section of the sealing ring 17 is greater than its thickness S so that the sealing ring has positional stability which opposes its rolling on the coupling element when it is acted on by a longitudinal force, for example, during the fitting of the flexible pipe or during the fitting of the sealing ring on the coupling element.

When the connector 10 is in the disassembled condition, as can be seen in FIGS. 2 and 3, the sealing ring 17 projects radially relative to the cylindrical surface of the coupling element 13. In preferred solution, the sealing ring 17 projects radially to a lesser extent than the teeth 16a, 16b An other words, the height D of the teeth 16a or 16b with respect to the base of the annular recess 20 is greater than the thickness S of the sealing ring 17.

Figure 4:
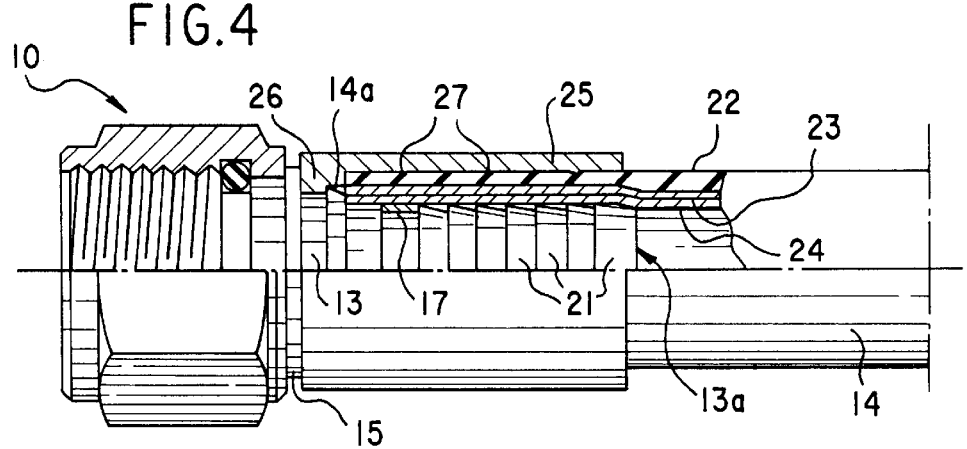
FIG. 4 is a partially-sectioned side view of a variant of the connector of. the present invention in the assembled configuration.

FIG. 4 shows a variant of the connector according to the present invention in an assembled condition of use, in which a row of ramp-like, annular teeth 21 arranged in a continuous series starting from the end 13a is formed on the coupling element 13. A single sealing ring 17 is fitted on the coupling element 13 between the row of teeth 21 and the intermediate tubular element 15, preferably near the last tooth 21 of the row, illustrated with broken line in FIG. 3. The flexible pipe 14 is fitted on the coupling element 13 so that its end 14a extends beyond the axial position of the sealing ring 17. The flexible pipe shown in FIG. 4 comprises an outer rubber covering 22 in which a reinforcing braid 23, preferably made of steel wire, is incorporated, and a tubular lining 24 of polyamide, particularly nylon.

In this embodiment, the element for clamping the pipe to the connector is constituted by a collar 25 having an end shoulder 26 which, in the assembled condition shown, abuts the intermediate tubular portion 15 of the connector. Like the collar 6 of FIG. 2, the collar 25 is clamped onto the flexible pipe 14 by plastic deformation so as to bring about localized deformation or squashing thereof in regions corresponding to the row of teeth 21 and to rings 27 formed in the inside wall of the collar 25.

If the annular teeth 16a, 16b, 21 project radially further than the sealing rings 17 and the latter are positioned downstream of the teeth with reference to the direction in which the flexible pipe is fitted, as shown in the embodiment of FIG. 2, axial stresses or displacement of the sealing rings 17 when the flexible pipe is fitted on the coupling element 13 are prevented. Arcuate profiles of the outside walls of the sealing rings 17 also favour the fitting of the flexible pipe onto the coupling element. The sliding of the flexible pipe unto the sealing rings 17 is also facilitated if the pipe has an internal polyamide sheathing 24 with a low coefficient of friction.

In any case, axial sliding of the sealing rings 17 is generally prevented or greatly limited by the friction between their inside walls 18 and the coupling element 13, particularly the bases of the respective recesses 20, this friction being favoured by the relatively large extent of the contact zone and by the resilient compression force exerted by the sealing rings on the coupling element.

When the flexible pipe 14 is fitted on the coupling element, it is clamped, as described above, by the radial plastic deformation of the collars 6 or 25, for example, by clinching or rolling. Naturally, the pipe 14 can be fixed to the connector by any of the known techniques usually used in this field such as, for example, even by means of reclaimable connections with shells, casings, and the like.

As a result of the compression of the outside wall of the pipe, a radial compression force is also exerted on the sealing ring 17 particularly on its outside wall 19, which tends to be flattened. Since the material of which the sealing ring 17 is made is substantially incompressible, the fact that the annular recess 20 formed in the coupling element 13 is wider than the sealing ring 17 housed therein allows the latter to expand longitudinally within the recess. The resilience of the sealing ring 17 tends to keep its outside wall 19 in close contact with the inside wall of the flexible pipe. Any temporary or permanent reduction of the compression force exerted by the pipe on the sealing ring 17 due, for example, to use in difficult conditions, to temperature swings, or to plastic yielding of the clamping collar, does not cause the formation of a gap between the inside wall of the pipe and the outside wall of the sealing ring 17, owing to the resilient recovery of the latter, at least within a wide range of values, the recovery depending upon the overall dimensional characteristics of the sealing ring, upon the resilience of the material, and upon the compression force initially exerted during assembly.

Naturally, the principle of the invention remaining the same, the forms of embodiment and details of construction may be varied widely with respect to those described and illustrated, without thereby departing from the scope of the present invention.

I claim:

1. A connector for a flexible pipe, the connector comprising:
    a cylindrical coupling element insertable into the flexible pipe, the coupling element having a hollow main body with an outer surface and at least one annular gripping tooth extending radially outward from the outer surface, the at least one gripping tooth having a front face substantially vertical relative to the outer surface and a back face inclined relative to the outer surface;
    clamping means for clamping the flexible pipe onto the coupling element, wherein when the clamping means is positioned on the flexible pipe in a direction radially outward from the outer surface of the coupling element and the flexible pipe is then compressed radially inward toward the outer surface, wherein the at least one gripping tooth grips the flexible pipe; and
    a radially resilient sealing ring having inner and outer walls, wherein the sealing ring compresses radially inward when the connector is in an assembled condition with the flexible pipe inserted thereon,
    wherein the outer surface of the coupling element includes an annular recess having a base, the recess is positioned adjacent to the front face of the at least one gripping tooth and the sealing ring is disposed in the recess, a radial height (D) of the gripping tooth is greater than a radial thickness (S) of the sealing ring relative to the base of the recess, and
    wherein the clamping means is positioned directly above the sealing ring in the radial direction when the connector is in the assembled condition, and when the clamping means is deformed in the radially inward direction, the clamping means applies a direct radial compression force onto the sealing ring that extends across a width of the recess.

2. The connector according to claim 1, further comprising a second gripping tooth having a front face substantially vertical relative to the outer surface and a back face inclined relative to the outer surface, the second gripping tooth extending radially outward from the outer surface, another recess being positioned adjacent the front face of the second gripping tooth with a second sealing ring provided therein,
    wherein the clamping means is also positioned directly above the second sealing ring in the radial direction when the connector is in the assembled condition, and when the clamping means is deformed in the radially inward direction, the clamping means applies a direct radial compression force onto the second sealing ring that extends across a width of the another recess.

3. The connector according to claim 1, wherein a width of the recess is greater than a width (H) of the sealing ring, and a depth of the recess is less than the thickness (S) of the sealing ring.

4. The connector according to claim 1, wherein the recess is disposed downstream of and substantially adjacent to the at least one gripping tooth relative to an end of the connector.

5. The connector according to claim 3, wherein the recess is disposed downstream of and substantially adjacent to the at least one gripping tooth relative to an end of the connector.

6. The connector according to claim 1, wherein a width (H) of the sealing ring is greater than the thickness (S) of the sealing ring.

7. The connector according to claim 1, wherein the outer wall of the sealing ring has any one of the following profiles: arcuate, cylindrical, recessed arcuate, sloped, pointed, and corrugated.

8. The connector according to claim 1, wherein the sealing ring is resiliently force fit in the recess.

* * * * *

UNITED STATES PATENT AND TRADEMARK OFFICE
CERTIFICATE OF CORRECTION

PATENT NO. : 6,460,897 B1 Page 1 of 1
DATED : October 8, 2002
INVENTOR(S) : Dardanio Manuli It is certified that error appears in the above-identified patent and that said Letters Patent is hereby corrected as shown below:

<u>Title page,</u>
Item [75], Inventor, correct the spelling of "Milan" to -- Milano --.
Item [73], Assignee, correct the spelling of "Bologno" to -- Bologna --.
Item [30], Foreign Application Priority Data, change "BO940102 U" to -- BO94U000102 --.

Signed and Sealed this

Twentieth Day of May, 2003

JAMES E. ROGAN
*Director of the United States Patent and Trademark Office*